(12) United States Patent
Ferguson et al.

(10) Patent No.: US 8,429,073 B2
(45) Date of Patent: Apr. 23, 2013

(54) METHOD AND APPARATUS FOR CONFIGURING AND ESTABLISHING A SECURE CREDENTIAL-BASED NETWORK LINK BETWEEN A CLIENT AND A SERVICE OVER A DATA-PACKET-NETWORK

(75) Inventors: Hill Ferguson, San Francisco, CA (US); Blake Hayward, San Francisco, CA (US); Ramakrishna Satyavolu, Fremont, CA (US)

(73) Assignee: Yodlee.com, Inc., Redwood City, CA (US)

( * ) Notice: Subject to any disclaimer, the term of this patent is extended or adjusted under 35 U.S.C. 154(b) by 0 days.

(21) Appl. No.: 13/188,691

(22) Filed: Jul. 22, 2011

(65) Prior Publication Data

US 2011/0282783 A1    Nov. 17, 2011

Related U.S. Application Data

(60) Continuation of application No. 12/764,435, filed on Apr. 21, 2010, now Pat. No. 7,990,895, which is a continuation of application No. 11/027,724, filed on Dec. 30, 2004, now Pat. No. 7,729,283, which is a continuation-in-part of application No. 09/737,404, filed on Dec. 14, 2000, now abandoned, which is a division of application No. 09/323,598, filed on Jun. 1, 1999, now Pat. No. 6,199, 077.

(60) Provisional application No. 60/533,696, filed on Dec. 31, 2003.

(51) Int. Cl.
*G06Q 40/00* (2006.01)

(52) U.S. Cl.
USPC ............................................ 705/40; 705/39

(58) Field of Classification Search ............... 705/40, 705/42, 44, 26
See application file for complete search history.

(56) References Cited

U.S. PATENT DOCUMENTS 6,061,665 A * 5/2000 Bahreman ...................... 705/40
2004/0215560 A1* 10/2004 Amalraj et al. ................ 705/40

* cited by examiner

*Primary Examiner* — Ojo O Oyebisi
(74) *Attorney, Agent, or Firm* — Donald R. Boys; Central Coast Patent Agency, Inc.

(57) ABSTRACT

A bill-paying service has an internet-connected server executing software from a non-transitory, machine-readable medium, the software providing functionality accessing, on behalf of a user, a plurality of billing servers, logging in with credentials supplied by the user, and downloading information concerning one or more bills which the user is responsible to pay, functionality receiving a selection by the end user, indicating a bill the user wishes to pay, and functionality transmitting to the user a deep-link plug-in (DLP) for the billing server where the bill selected by the client is associated, the DLP redirecting the user to a page at the billing server where the user is enabled to pay the bill selected.

6 Claims, 5 Drawing Sheets

METHOD AND APPARATUS FOR CONFIGURING AND ESTABLISHING A SECURE CREDENTIAL-BASED NETWORK LINK BETWEEN A CLIENT AND A SERVICE OVER A DATA-PACKET-NETWORK

CROSS-REFERENCE TO RELATED DOCUMENTS

The present invention is a Continuation to co-pending U.S. patent application Ser. No. 12/764,435, filed Apr. 21, 2010, which is a continuation of U.S. patent application Ser. No. 11/027,724, filed Dec. 30, 2004 and issued as U.S. Pat. No. 7,729,283 on Jun. 1, 2010, which is a CIP to U.S. patent application Ser. No. 09/737,404, filed Dec. 14, 2000 and now abandoned, which is a divisional to a U.S. patent application Ser. No. 09/323,598, filed on Jun. 1, 1999 and issued as U.S. Pat. No. 6,199,077 on Mar. 26, 2001. Application Ser. No. 11/027,724 also claims priority to a U.S. provisional patent application Ser. No. 60/533,696, filed Dec. 31, 2003. The above subject matters are included herein in their entirety by reference.

BACKGROUND OF THE INVENTION

1. Field of the Invention

The present invention is in the field of network browser navigation and authentication methods and services and pertains particularly to a method and system for configuring and establishing a credential-based network link between a client and a service over a data-packet-network.

2. Discussion of the State of the Art

Internet browser navigation, typically referred to as "Web surfing" in the art, is well known as a mechanism enabling user access to server-stored electronic information pages on a navigable network such as the Internet network. A typical user navigating the Internet for example may have subscriptions to many password-protected Web sites that offer some form of service to the user. Examples of password-protected sites may include financial service sites such as investment, mortgage, and online banking sites, travel sites, certain entertainment and music sites, news service and information sites, and so on.

Typically, a user might have a variety of different passwords and/or personal identification numbers (PINs) that may be required to successfully log in to many of the types of sites described above. As a result, a user may frequently be required to enter login information as new password protected sites or pages are navigated to. A Web browsing session embarked to conduct a large chunk of Web business, for example, may involve several logins during one Internet session. Having to remember many passwords and PIN numbers can be problematic for a user. Often a same password or code cannot be used for every service, as another user may have already taken the password or code. A user may not wish to supply a code unique to the user such as a social security number because of security issues, including quality of security, which may vary from service to service. Additionally, many users at their own volition may choose different passwords for different sites so as to have increased security, which in fact also increases the number of passwords a user may have.

The inventor knows of a WEB service that allows a client to store multiple Web site links or list entries of Web sites, some or all of which may be password protected or otherwise secured as links in one network location. A feature of the above service allows a user to program certain tasks into the system such that a software agent of the system may execute tasks at the client's listed Web sites based on that client's instruction. Although not necessarily designed specifically for a bill-pay environment, this service may be used to aggregate a client's billing sites and may be used to automatically pay bills at those listed sites for the client. The service may be directed to store user password and login information for clients and may be configured to use that information to gain access to the clients' sites, thus enabling clients to navigate by proxy to disparate sites without having to manually input login or password codes in order to gain access to the sites.

The above-described service uses a portal server to present a user-personalized application that may be displayed as an interactive home page and that contains all of the clients' listed Web sites (provided as hyperlinks) for easy navigation. This approach combines a consolidation model and a direct billing model if applied to bill payment enabling certain benefits of both models.

For example, the above-described service enables bills to be paid through one interface and because the billing parties are linked to the Web portal, access to bill details and bill-pay confirmation notification is possible. However, a client must trust the service to keep all of the clients secure information for accessing the disparate billing parties and must trust the service with secure information for accessing any source accounts the client has approved through the service for bill payment. Moreover, if a client elects automated bill payment, the service may not provide the kind of detailed account information a client may wish to review, nor is it likely that the service would help in any way with any kind of dispute correspondence that may arise between a client and a billing party.

With exception to the aggregation service listed above and known to the inventor, typical bill consolidation services do not provide automated password login procedures. In general, payment of bills over the Internet using bill consolidation practices may take variant forms. One common form generally follows a typical bill-consolidation model. The conventional bill consolidation model is essentially a clearinghouse, where payment of bills may be accomplished at a single network location or portal. In general, the bill consolidator providing the bill-pay service retrieves a client's bills from participating third parties doing business with the client. In addition, the bill consolidator may also, in some cases, process bill payments on behalf of the client. In the case of bill payment services provided by a bank, for example, consolidated bills may be presented to the client and the client may provide instructions to the bank regarding where, when, and with what resources those bills should be paid. In such an example, typically only a resource account held at the bank may be eligible as a source account for bill payment.

In a direct billing model, there is a lack of bill consolidation services altogether. For example, individual billing parties may provide direct electronic bill-payment services through their own-hosted Web interfaces for clients. In the direct model the client may be required to maintain multiple billing party sites, passwords, personal identification numbers (PINs) and possibly software mechanisms in order to successfully pay bills online. In contrast to the consolidation model described above, in a direct model, benefits not typically offered in a consolidation model such as the ability to view detailed account information; the ability to receive instant bill-pay confirmation; the ability to dispute payment issues; and so on may be provided.

Although the service known to the inventor described further above could be used to aggregate a client's billing party Web sites and may also be used to aggregate the personal login usernames, passwords and PINs for use in automated login to the listed sites, a client may still be required to manually populate forms for bill payment, which may vary from site to site and confirm payment source-account information, and the like. If automated payment services are elected wherein the portal service, via software agent, automatically gains access to the site, populates forms with secure information and completes transactions on behalf of a client, there still may be problems associated with disputed amounts, level of bill details provided and so on. This is because the automation agent for navigation, login and form population is limited in scope to just what is required to complete simple transactions and to gather general summary information about accounts and services.

One challenge to providing such an aggregation service for payment of bills is continued maintenance requirements of client parameters and third-party service parameters including updates and the like. For example, billing parties may change forms, procedures, navigation paths, security procedures, and so on. Coordinated effort by clients and the consolidation service is critical for smooth operation and the amount of continued maintenance and updating tasks may be daunting for a service that handles many clients, thus forcing higher rates to clients when compared to typical consolidation services related to service charges or subscription fees.

Therefore, what is needed in the art is a system and method that solves the problems described above inherent to direct and consolidation billing models in a way that distributes work between the service and the client. A system such as this would facilitate higher-level communication and account information accessibility from each billing party while still enabling payment of bills to disparate parties through one electronic interface.

SUMMARY OF THE INVENTION

In an embodiment of the invention a bill-paying service is provided, comprising an internet-connected server executing software from a non-transitory, machine-readable medium. The software provides functionality accessing, on behalf of a user, a plurality of billing servers, logging in with credentials supplied by the user, and downloading information concerning one or more bills which the user is responsible to pay, functionality receiving a selection by the end user, indicating a bill the user wishes to pay, and functionality transmitting to the user a deep-link plug-in (DLP) for the billing server where the bill selected by the client is associated, the DLP redirecting the user to a page at the billing server where the user is enabled to pay the bill selected.

In one embodiment the client's connection to the internet connected server of the billing service remains intact when the user is redirected to a billing server, enabling the client to select and pay bills to individual ones of the billing servers in sequence. Also in one embodiment the DLP provides confirmation and acceptance of new payment information.

In another aspect of the invention a a method for paying bills is provided, comprising the steps of (a) accessing, on behalf of a user, a plurality of billing servers; (b) logging in to the billing servers with credentials supplied by the user; (c) downloading information concerning one or more bills which the user is responsible to pay; (d) receiving a selection by the user, indicating a bill the user wishes to pay; and (e) transmitting to the user a deep-link plug-in (DLP) for the billing server where the bill selected by the client is associated, the DLP redirecting the user to a page at the billing server where the user is enabled to pay the bill selected.

In one embodiment the client's connection to the internet connected server of the billing service remains intact when the user is redirected to a billing server, enabling the client to select and pay bills to individual ones of the billing servers in sequence. Also in one embodiment the DLP provides confirmation and acceptance of new payment information.

BRIEF DESCRIPTION OF THE DRAWING FIGURES

DESCRIPTION OF THE PREFERRED EMBODIMENTS

Figure 1:
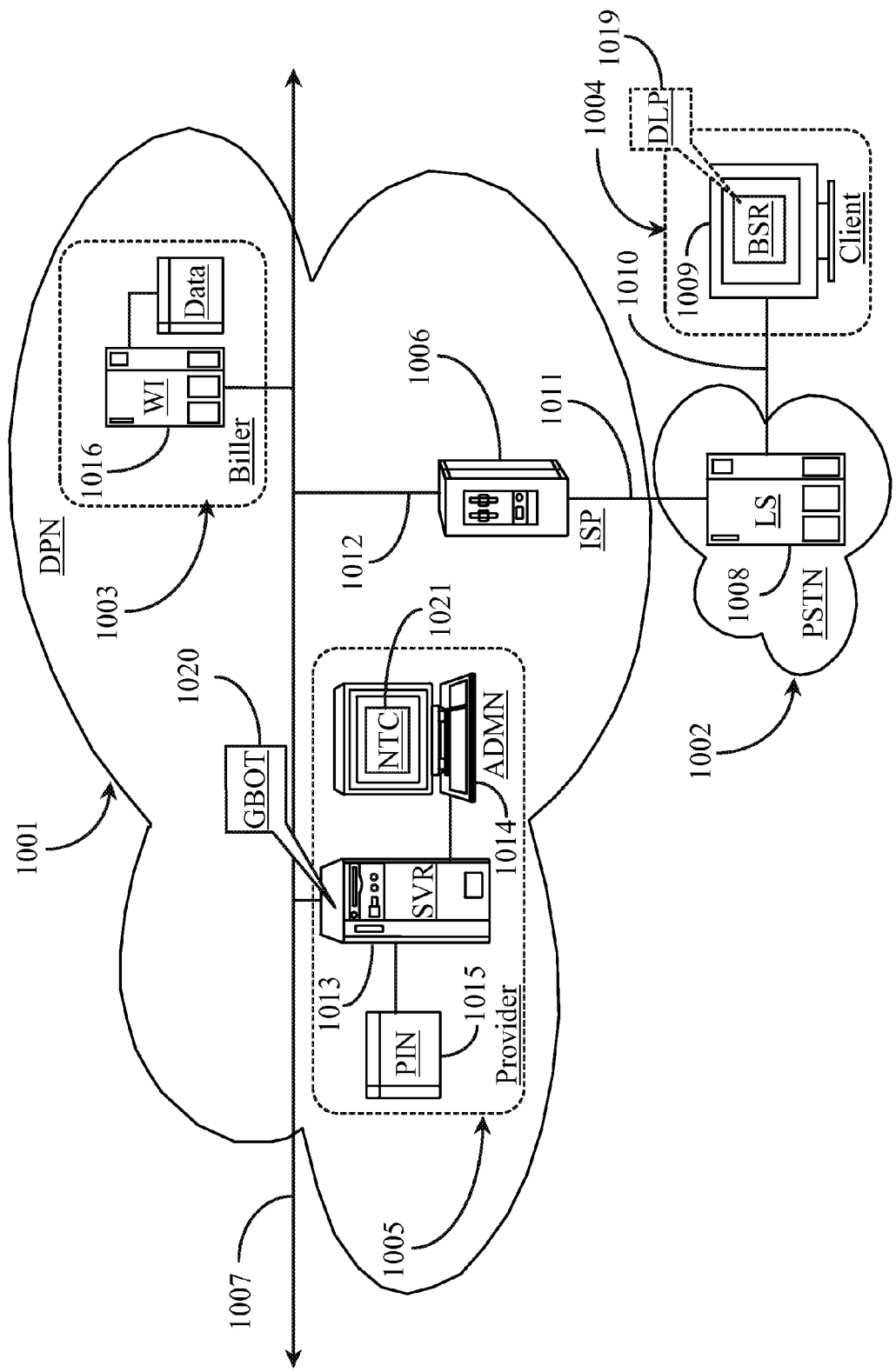
FIG. 1 is an architectural overview of a data network over which credential-based network linking between a client and service is practiced according to an embodiment of the present invention.

FIG. 1 is an architectural overview of a data network over which credential-based network linking between a client and service may be practiced according to an embodiment of the present invention. This architecture includes a data-packet-network (DPN) 1001, which may be a wide-area-network (WAN) such as the well-known Internet network. DPN 1001 may also be a corporate WAN or Intranet, a metropolitan-area-network WAN, or a private WAN. In a preferred embodiment DPN 1001 is the Internet network owing to characteristics of large geographic coverage and high public access. DPN 1001 may be referred to also in this specification as Internet 1001.

In accordance with a preferred embodiment, Internet 1001 is typically, although not exclusively, accessed through a public-switched-telephone-network (PSTN) 1002. PSTN 1002 may be another type of telephony network including a wireless carrier network without departing from the spirit and scope of the present invention. In this example, there are three interacting parties illustrated herein as a service provider 1005, a direct billing party 1003, and a client station 1004.

Internet 1001 has a network backbone 1007 illustrated as extending there through. Backbone 1007 represents all of the lines equipment and connection points that make up the larger network as a whole. Therefore, it will be appreciated that there are no geographic limits to the practice of the present invention. Both billing party 1003 and service provider 1005 have Internet domains represented logically herein by dotted rectangles enclosing each party.

In Internet 1001, billing party 1003 represents any direct billing party that may be accessible through an on-line Web interface. As such, a Web interface (WI) 1016 is illustrated within the domain of party 1003 and has connection to backbone 1007 for access and communication. WI 1016 may be a server adapted to enable clients such as client 1004 to access account information and pay bills. Client 1004 may be considered a client of billing party 1003 in this example. WI 1016 as a data repository associated therewith and labeled herein Data. Such a repository may hold client data, account data, payment history, and other like data categories maintained on behalf of the clients and managed for the purpose of business interaction in general.

Client station 1004, also referred to herein simply as client 1004, has a client networking device 1009 illustrated therein, which may be any type of network-capable communication device such as a computer, a personal digital assistant (PDA), a network capable telephony device, and so on. In this example, a simple computer icon is used to illustrate a device capable of accessing WI 1016 and of interacting therewith for the purpose of conducting business including payment of bills associated with a client account.

In his example, client 1004, or more particularly device 1009 has a telephony connection 1010 to a local telephone switch (LS) 1008 within PSTN 1002. Switch 1008 bridges client 1004 to an Internet Service Provider (ISP) 1006 via a telephony trunk 1011. ISP 1006 may be assumed to contain all of the equipment including a connection server for enabling Internet access for the client. ISP 1006 has connection to backbone 1007 via an Internet access line 1012. In this way client 1004, operating device 1009 running a network browser application (BSR) may access WI 1016 through, in this case, a dial-up connection through ISP 1006. Other network connection types may also be used by client 1004 to access WI 1016 without departing from the spirit and scope of the present invention. Integrated Services Digital Connection (ISDN), Digital Subscriber Line (DSL), cable modem, and other known methods of connection may apply in some embodiments.

Service provider 1005 is adapted to provide services to client 1004 that have relation to aiding client 1004 to manage accounts and to pay bills with respect to direct billing party 1003 and other direct billing parties similar to party 1003 that the client may have subscription to. Provider 1005 has a server (SVR) 1013 illustrated therein as having connection to backbone 1007 for access and communication. Server 1013 may be a Portal server wherein information is maintained on behalf of client 1004 by way of interactive Web page or other form of network display. Provider 1005 is adapted in a preferred embodiment to help client 1003 to conduct business with party 1003 among other parties in a way that reduces work required of the client.

For example, server 1013 has connection to a data repository 1015 adapted to store client passwords and personal identification numbers (PINs) used typically to enable secure access to WI 1016 over the network. Secure Socket Layer and other security protocols may also apply. In a preferred embodiment, provider 1005 is able to access WI 1016 on behalf of client 1004 using login and password information stored in repository 1015. Provider 1005 has an administrator (ADMN) computing station 1014 provided therein and connected to server 1013 through a local-area-network (LAN) or other network or direct-link connection. Station 1014 may be a desktop computer. There may also be other ADMN station like station 1014 connected to server 1013 without departing from the spirit and scope of the present invention. The inventor illustrates only one such station and deems the illustration sufficient for the purpose of explaining the present invention.

Station 1014 has a software building application termed, in this example, a navigation template creator (NTC) 1012 installed thereon and executable therefrom. NTC 1021 is adapted to enable an administrator or other knowledge worker or service worker to create an instruction or instruction set in template form that, once created, can be used to direct a network-capable node running a browser application to navigate to another network node and to interact with that node according to existing node protocols and business rules of the host of the node. For example, such a navigation template can be used to direct and to provide instruction to client device 1009 for navigation to and for interaction with services available to client 1009 through WI 1016.

In one embodiment of the invention, a navigation template created by NTC 1021 may also be used by service provider 1005 to obtain information from a third-party Web site like WI 1016 on behalf of a client using the client-supplied login and password independently from any client involvement. This may be accomplished by a software application termed gathering agent or gathering bot (GBOT) 1020 illustrated herein as installed on server 1013 and executable therefrom. GBOT 1020 is a software instance capable of automated and scheduled network navigation and data gathering independent of an operator and may be automated per scheduling to access network nodes such as WI 1016 using a navigation template and provided or accessible security data and any task-performance data that may be supplied by a client.

In one embodiment GBOT 1020 accepts extensible Markup Language (XML) based instruction including metadata for navigating to Universal Resource Locators (URL), which may be Web sites or other displayed forms including internal system path information for accessing passwords and PINs for use in automated login to the site or sites having instruction provided in or with a navigation template. Using this technology, which is known to the inventor, provider 1005 may access sites on behalf of clients and gather information from those sites, the navigating agent emulating the client. Passwords, PINs and any other login or secure-access codes are kept encrypted in repository 1015 and are decrypted only to an extent necessary for logging in to a client site. Likewise, provider 1005 may maintain additional client secure data such as source account information required to pay bills online, credit card information, pass phrases, and the like required normally by the client to interact with secure sites.

However, as described in the background section above, the technology may, in some cases be limited by design to provide indirect bill payment services, account summary generation, and limited automated interaction capability on behalf of clients. In current art without benefit of the present invention, provider 1005 may be able to aggregate client information from several sites analogous to billing 1003 and provide that information in one location accessible to client 1004, for example, client 1004 then could elect to have provider 1005 pay bills on behalf of client 1004 in a general way without allowing for more in depth interactions that often accompany a direct-billing environment. Summaries of account information may be gathered and prepared for a client including balance information and other information that may be acquired by screen scraping.

In a preferred embodiment of the present invention, provider 1005 is further enabled to package created navigation instruction, secure access data, form population data, source account information, and execution instruction into a portable and downloadable software executable illustrated herein as a deep-linking plug-in (DLP) 1019 installed on network-capable device 1009, preferably transparently, to a client browser application (BSR). DLP 1019 may be Java-enabled for remote execution or may be of the form of another executable program language that enables triggered and/or scheduled browser execution and Web task implementation.

In this way, provider 1005 may enable client station 1009 to automatically and transparently forge a credential-based secure network connection directly to WI 1016, for example, in order to pay a bill or perform other account-related transactions according to provided instruction and data included in plug-in 1019. A credential-based network link, termed a deep link by the inventors may be enabled for a single activity like paying a bill, or for more than one activity such as paying a bill and then changing source account data or perhaps, updating payment history and then paying a bill.

Plug-in 1019 may provide a single deep-link to a direct billing parties Web interface, or more than one deep-link, each to a separate billing party site. A deep-link may be established and executed in the background transparently to a client without causing an interruption in a link established between a client like client 1004 and provider 1005. In this way, provider 1005 may still aggregate Web sites and information for client 1004 presenting such information in a single location accessible to the client which may also include actionable options regarding functions, a client has setup with those sites such as paying bills. However instead of forging separate links between provider 1005 and each client-registered site or establishing links by proxy between the client, provider, and client-registered site, the client is enabled to establish one or more deep links directly to the client-registered sites transparently without requiring login procedures, manual form population, or other manual navigation functions normally required when interacting with a direct billing interface.

The benefits of deep-linking are apparent to one with skill in the art of network services in that for many clients serviced simultaneously, server 1013 does not have to maintain as many server connections. Similarly, programs that provide bill payment confirmation, acceptance of new payment information and so on may be packaged with DLP 1019 and do not have to be run on server 1013. Likewise, much work related to manual navigation and form or electronic interface field population can be reduced or eliminated altogether for a client using the service of the present invention.

One with skill in the art of bill pay services will recognize that in the event of further necessary action not anticipated by template, the client already has a direct connection to a billing party site and can, at any time or upon prompt or notification, establish the visibility of the transparent link by calling up an additional or second browser window whereupon normal direct manual navigation and interaction between the client and the Web interface may be carried out and the interaction results fully visualized.

In a preferred embodiment of the present invention client 1004, having an account set up with provider 1005 first establishes a service account with a third party service like billing party 1003 and then provides certain information to provider 1005 when registering the service account for bill-pay services. The information may include but is not limited to login password, PIN, URL data, source payment account data, and any secure information related to those source accounts and, perhaps, which accounts may be cited to pay which bills and so on.

Some information may be gathered from the service that client 1004 is registering with the provider. Minimally, client 1004 need only supply provider 1005 with a URL to a resource maintained, in this case in WI 1016 and the secure password information enabling login and service access. Identification and other data related to a money or financial account owned by the client and approved for paying certain bills from may be provided in some cases to service 1003 or alternatively to provider 1005 depending on the nature of the transaction process.

Provider 1005 maintains secure information for client 1004 and creates one or more navigation templates based in part on initial client information such as main URL and in part on what data can be gathered from the site in terms of client functions that the site allows to be performed and those navigational sequences and form-population requirements. Provider 1005 may maintain a personal Web page for client 1004 where the client's consolidated site information and billing information may be presented along with actionable options associated with each listed party such as "pay now", "schedule payment", "view balance" and so on. These actionable items may be triggers for a client connected through a secure network connection to initiate a process of receiving one or more DLPs 1019 that are pre-created.

In one embodiment, client 1004 may access SVR 1013 and select one or more billing parties and execute a pay now option. Upon execution thereof, DLP 1019 is automatically downloaded and is automatically installed as a plug-in to the browser of client 1004. Once installed, DLP 1019 automatically executes, in one embodiment, and initiates a deep link to a first billing party and uses client-provided password and PIN information to gain access to, in this case, a bill payment page or Web form. The instruction set provided in DLP 1019 provides the required logic for automatically populating the billing parties electronic payment form with the payment amount and payment account source data and automatically executes or submits the form once populated with the correct data.

The form population data and secure login information is made part of the plug-in and resides in encrypted format until it is used. After a transaction is complete, DLP 1019 may provide some form of client notification that a particular transaction was accepted or rejected at which point the client may intervene, for example, in case of rejection and manually take over the deep link to perform any other tasks. If DLP 1019 is programmed to navigate and perform tasks at more than one site, then a deep link may be established for each listed site in sequential order until all navigation and programmed tasks are performed.

In one embodiment DLP 1019 may only establish a single deep link to one site and additional DLP modules may be required for establishing other deep links. In some secure environments a service site may require that a client machine be identified before allowing a secure transaction. Provision of an automatic deep link enables the client to automatically complete secure transactions of this type from his or her own machine in a transparent and efficient manner.

Figure 2:
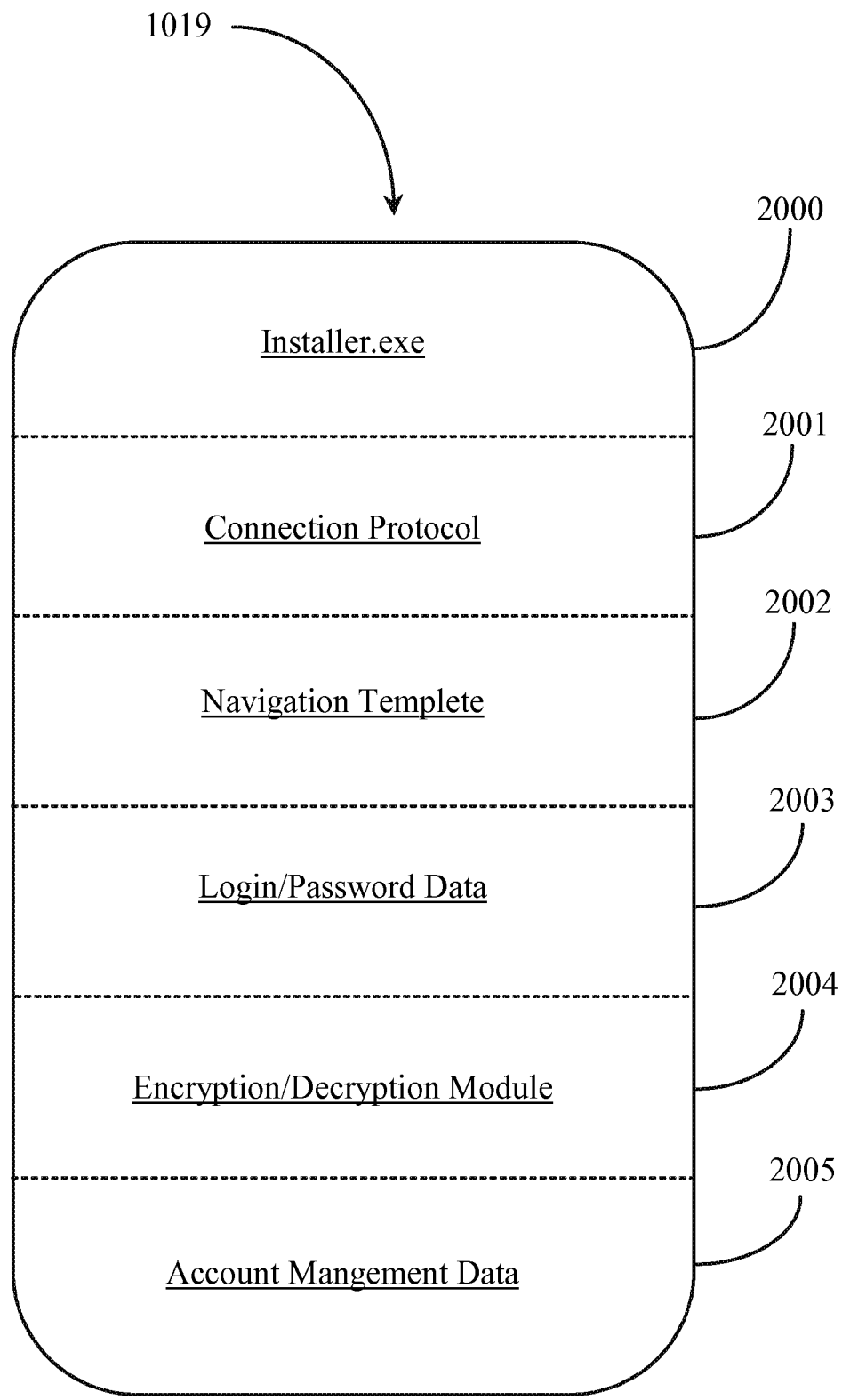
FIG. 2 is a block diagram illustrating components of a navigation plug-in used to establish one or more credential-based network links between a client and one or more services according to an embodiment of the present invention.

FIG. 2 is a block diagram illustrating components of navigation plug-in 1019 of FIG. 1 used to establish one or more credential-based network links between a client and one or more services according to an embodiment of the present invention. Plug-in 1019 may be thought of as a software module with several components. Plug-in 1019 has an installer exe. 2000 provided as a component thereof, which is adapted to enable a transparent automated installation to a client browser application.

Once a client has navigated to a provider site analogous to site 1005 of FIG. 1 and has accessed his or her personal Web page, he or she may select from listed billing parties and options to cause a download of one or more plug-ins 1019. Each download will be appropriate for the pre-configured actionable option or options the client has selected. Therefore, in one embodiment plug-in 1019 is automatically downloaded and installed based on a trigger event.

In one embodiment, a client may select from pre-configured plug-ins and download one or more based on desire or have them downloaded based on a trigger event. The installation and deep link initiation may still be performed in an automated fashion with client transparency to the process based on client instruction. For example, if a client downloads a "Pay Now" plug-in specific to one billing party, then the installation and establishment of a deep link between the client and the party may be automatic including performance of the transaction (Pay) while the client is still connected to provider 1005. In one embodiment, a client may elect to establish the deep link the next time he or she connects to the network instead of doing so at the current session.

In one embodiment, plug-in 1019 may be configured to execute within a specific time window such that if pre-loaded in a client browser, it will execute at the first opportunity within the window that the client has selected if the client connects to the network within the stated window of time. More particularly, it is possible that a client may download one or more plug-ins 1019 near the beginning of a payment cycle and that those plug-ins will each execute within a specific window of time during the client's normal network use activity. In this embodiment, notifications may be caused to pop-up at such times that transactions have been completed using a deep link regardless of the client's concurrent network location he or she is connected to at the time.

Plug-in 1019 has a connection protocol layer 2001 provided thereto and adapted for containing the protocol support modules for a particular client's preferred and configured connection methods and protocols used. For example, a plug-in might be configured to work with a particular TCP/IP connection used by a preferred browser instance. Likewise, the connection may be an Ethernet or other type of network connection using differing protocols. If a user employs a same browser application for browsing two differing connection types, it may be preferred that a deep link be established only when the default or chosen connection is active.

Plug-in 1019 has at least one navigation template layer 2002 adapted in a preferred embodiment, to contain the browser instructions for navigating to main and sub-domains of the target site or site of the plug-in. Navigation layer 2002 also may contain task instructions for navigating service options and performing tasks including subsequent navigation within a same domain or sub-domain.

Plug-in 1019 has a login/Password data layer 2003 provided thereto and adapted to contain and class any secure passwords, PINS, or other login codes needed by the navigation layer to gain access to services. Layer 2003 may also contain those secure passwords and/or PINS for securing access to source payment accounts held by a client and which are client-authorized as payment accounts that a service may access for receiving payment.

Plug-in 1019 has an encryption and decryption layer 2004 provided as a component thereof and adapted to provide encryption and decryption services for managing any secure data included as part of plug-in 1019. Such data may be securely stored on a client machine, in one embodiment, in decrypted format until it is necessary to retrieve and use the data for login or other secure process purposes.

Plug-in 1019 has an account management data layer 2005 provided thereto and adapted to contain any site management data such as form population data including secure personal information, and any other account data that may be required for submission during a transaction such as private account numbers, payment account numbers, and data that may be required in some instances for site searching, or other data input parameters that might be requested as part of a transaction process. In one embodiment plug-in data in embedded. However in another embodiment plug-in 1019 may access data physically stored in a client's machine memory or cache memory for retrieval during an execution of a deep linked session. In this case internal data paths to the data on the client machine according to a default file system may be appended automatically to the navigation sequence instructions if it is needed during a deep-linked transaction.

In one embodiment of the present invention if a client performs a deep link transaction to pay a bill or to perform another transaction, the results of that transaction performed may be saved and uploaded back over the first secure link established between the provider and a client as an update to client data currently displayable for the client at a first interface. In another embodiment where a client may obtain a deep link plug-in and then go off line, and update may be provided at a next client login to the provider after a session has been conducted. In one embodiment to see whether a deep linked transaction has succeeded, the client may go back to his home page maintained on the provider server analogous to SVR 1013 of FIG. 1 and look for an indication that the transaction has been completed. Such an indication may be a simple as a dated balance shift resulting from a payment transaction made.

Plug-in 1019 may be provided as one download or as more than one download without departing from the spirit and scope of the present invention. Moreover, plug-in 1019 may be provided with additional or with fewer components than those shown in this example without departing from the spirit and scope of the present invention. Plug-in 1019, in this example, is illustrated with basic components although other types of components and configurations are possible without departing from the spirit and scope of the present invention.

Figure 3:
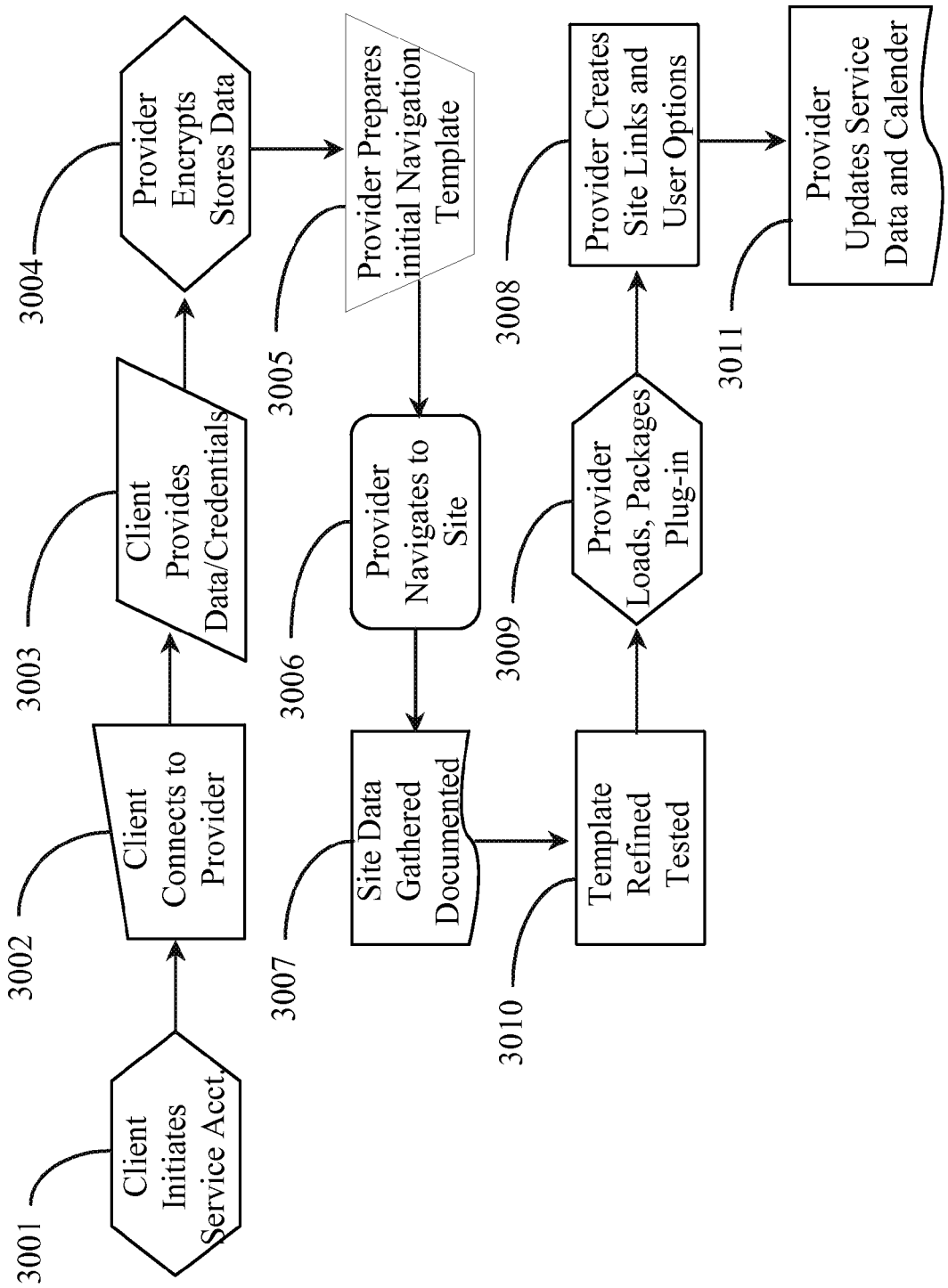
FIG. 3 is a process flow diagram illustrating steps for configuring a credential-based network link according to an embodiment of the present invention.

FIG. 3 is a process flow diagram illustrating steps for configuring a credential-based network link according to an embodiment of the present invention. At step 3001, a client analogous to client 1004 of FIG. 1 initiates an account with a billing party analogous to party 1003 also of FIG. 1. An example of such an account may be one set up for online transactions with a utility service companies Web interface. Certain information becomes available resulting from the performance of step 3001. For example, the utility service now has secure payment account information for the client along with any login and password or code information the client uses to access the site and perform transactions such as paying a bill.

The client has certain information resulting from the performance of step 3001 such as the above-described password, PIN, or pass phrase/code data and URL link information and, in some cases downloaded controls that facilitate interaction with certain technologies that may be required in the server transaction method or process.

At step 3002, the client, after establishing an on-line account with a service, connects over the prevailing network to a provider analogous to provider 1005 of FIG. 1. At step 3003, the client provides data and credential-based information to the provider. Such data may include but is not limited to passwords, usernames, PINs, credit account information, payment account information, account numbers, and the like. In this step, the client may also provide a URL to the main site and any general information about which transactions the client may desire to perform at the site.

In a preferred embodiment, the client need only provide credential-based information and a main URL to register a direct billing service to the provider site. Data gathering may be employed to retrieve the service sites options and transaction procedures and the sub-domains hosting those options and procedures. In other words, provider 1005 may set up the rest of the plug-in for the client after the client has provided login information and credential-based data required to enter the site.

At step 3004, the provider encrypts the appropriate data transmitted thereto by the client over a secure socket layer (SSL) or other secure connection and stores the information on behalf of the client in encrypted format and associates the information to the pending inclusion of the service to the client's provider account. After step 3004, the provider has all of the required information to set up the service for deep linking. At step 3005, the provider prepares an initial navigation template from data supplied by the client. The initial template contains preliminary instructions for navigating to the main service page and for logging into that page using the client-supplied credentials.

At step 3006, the provider navigates to the main site on behalf of the client and logs in as the client. In a case where the service expects to identify a certain or specific machine to access the site using the credentials, the provider may, insert the correct machine information (provided by the client) into a required field, or in another embodiment, the client and service may be persuaded to turn off this feature if it is a block to the access of services. The latter embodiment is not preferred as in the preferred embodiment data gathering and site information gathering is performed transparently to the server.

In a preferred embodiment the provider navigates initially to the client service to gain additional data from the site at step 3007. Additional data may include account balance, account history, and billing schedule, so that the provider may notify the client independently from the client's service and may also provide summary information to the client in an independent manner.

In one embodiment, step 3007 also involves gathering site information about page layout and forms used by the service and further navigation information and rules for using the forms. Further, gathered information may include additional options provided normally at the service location, but that a client has not yet configured for use. In this case the provider site may provide that information independently to the client as well as provide navigation instructions in the form of a deep linking plug-in or portion thereof that may be successfully used by the client without prior navigation or task performance related to those additional features having been performed previously from the client machine.

At step 3008, the provider refines template navigation and task performance instructions used for plug-in components and tests them for successful navigation and task performance success. The testing can be performed in a modeled situation without actually navigating to the site and initiating any transactions that the client has not elected.

At step 3009, the provider loads and packages basic plug-ins that can be used by the client to initiate a deep link from the client machine to the service machine in order to pay bills and perform other transactions like changing payment account information, ordering a payment history, changing a credit card number, or even setting new passwords or PINS.

At step 3010, the provider creates a service entry for the client and creates available transaction options accepted by the service. Options may solely include payment of bills. In one embodiment other types of transactions that could otherwise be performed manually at the service may be included as options for deep-link transaction processing. The exact extent that the provider creates plug-in modules that can perform tasks other than what the client currently or routinely performs at the site may be based in part on client instructions or on enterprise discretion. For example, only a single option of "pay bill" may be provided for a client service, which a client may activate to trigger download and execution of the appropriate plug-in. However, the provider may inform the client that certain grayed out task buttons can be activated and already have basic plug-ins or plug-in options developed for them.

For a bill that varies in amount every payment period like a telephone bill for example, the provider periodically accesses the service site on behalf of the client and gathers the latest account information. The provider can make this information available to the client independently of the service site. Likewise, a plug-in for a task that may require some input by the client may be configured to prompt the client during run of the module for the input information such as a new password or username to replace an existing one. In one embodiment, the service provider may, if allowed by the client, create new password and username information for the client.

At step 3011, the provider periodically navigates to the site on behalf of the client and updates service data and calendar information for the client. Step 3011 is not specifically required in order to practice the present invention as a client may elect to receive payment and calendar information through traditional means and may navigate to the provider site just for the purpose of conducting transactions using deep linking technology.

Figure 4:
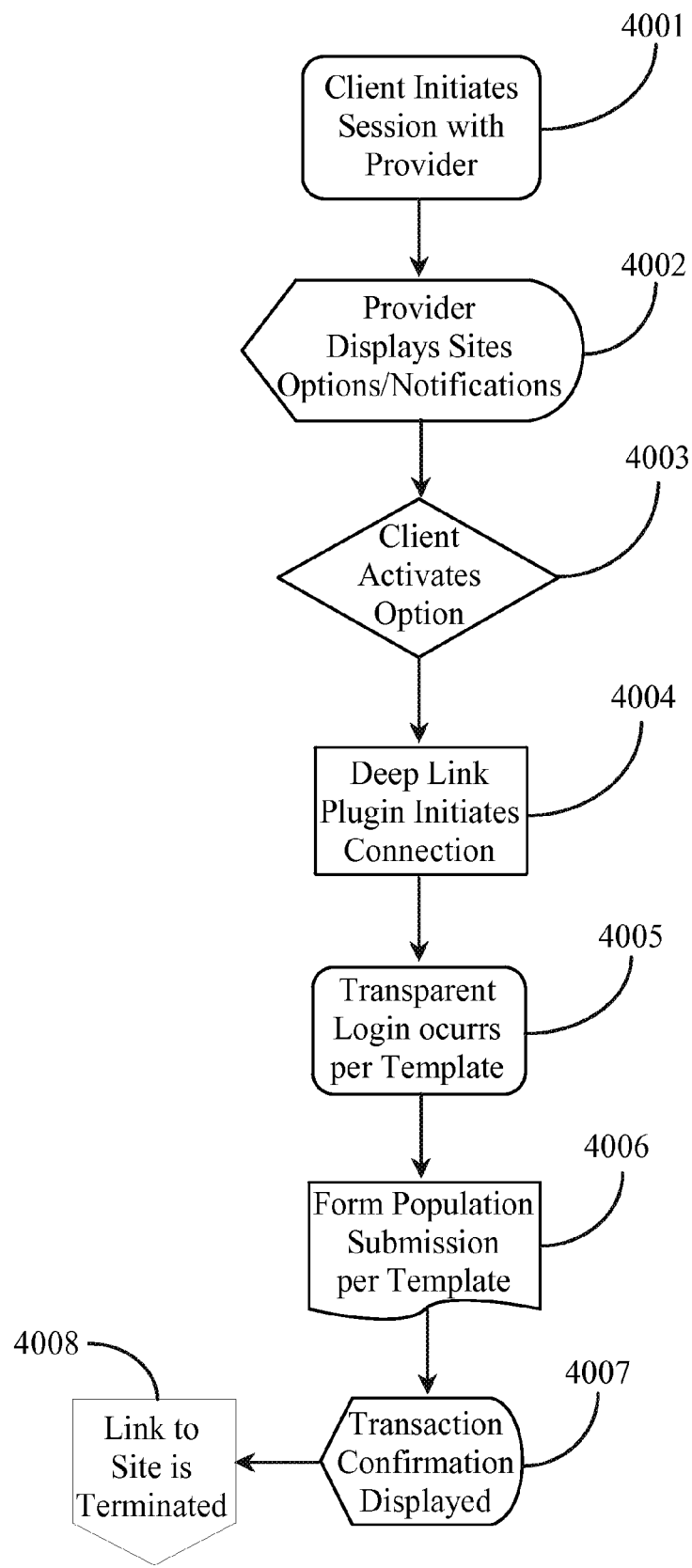
FIG. 4 is a process flow diagram illustrating steps for establishing and practicing a credential-based link according to an embodiment of the present invention.

FIG. 4 is a process flow diagram illustrating steps for establishing and practicing a credential-based link according to an embodiment of the present invention. At step 4001, a client analogous to client 1004 of FIG. 1 initiates a network session with a provider analogous to provider 1005 also of FIG. 1. The session may be an Internet Web session and the client may provide a password or PIN for authentication purposes.

At step 4002, the provider presents or serves a Web page personalized to the client. The served page may be an HTML page containing the clients listed billing party sites and associated available options and any notifications associated with those sites. For example, a utility company listing might be associated with an option "pay now" and a notification also associated with the listing might be a notification that a certain bill amount is now due. Such a notification may be provided in the form of a real simple syndicate (RSS) feed, a window pop-up, or a notification bar adapted for the purpose. Likewise notifications of bills due may be integrated with a dash-board style calendar that shows the days of the month wherein due dates, amounts, and billing party identification appear on the appropriate days of the month.

At step 4003, the client selects and activates at least one option related to at least one billing party. A likely option may be a pay now option associated with a single billing party for example. The action performed at step 4003 triggers an appropriate deep link plug-in analogous to plug-in 1019 of FIG. 2 to be immediately downloaded to the client over the existing network connection and to automatically install and execute initiating a deep link connection between the client and the related billing party server at step 4004.

At step 4005, the deep link is in a connected state and the any login procedures are automatically and transparently performed including navigation to a transaction page or form. At step 4006, the deep link plug-in automatically fills the appropriate form fields of an electronic transaction form provided by the billing party to enable the intended transaction. At this step, the deep link plug-in retrieves the appropriate data for form filing including the stated billing amount and source account information. The source account could be a credit account, a checking account, a pay-pal account, or another approved type of source payment account. Also in this step, the completed form is submitted by the deep link plug-in all transparently to the client. It is noted herein that the associated accounts are in a preferred embodiment maintained separately and no money is handled for the client by the deep-link service.

At step 4007, the deep link plug-in may optionally display a notification providing resulting state of the just-submitted transaction. Such a notification may describe whether the transaction was successfully completed and whether payment has or has not been confirmed by the billing party. After successful confirmation, at step 4008, the deep link is terminated and the task is complete. The deep link session may be initiated and maintained in the background while the user is Web browsing the provider site or another site until the deep link is no longer required and step 4008 is performed. According to the nature of the client's source payment account information, a direct billing service may already have access to such an account as approved by the client. However in one embodiment the source account data may be provided to the service only during a deep linking session for a particular transaction. As such, account numbers, checking numbers and any approval PINs or other credential-based data as might be required can be provided by the plug-in during the session as the transaction ensues. The client may, if desired, change such account information at the site of the provider and the provider may then update a plug-in with the new payment information.

In one embodiment, a client may intervene in the process and take over manually if there is a reason to do so. For example, if a credit card has expired or otherwise is not accepted by the billing party, a notification thereof may prompt the client to manually enter a new or replacement card number and expiration date. If a client decided to intervene he or she may select an option provided in the browser toolbar or some other display location that may cause the deep link session to become visible in a separate window. At this point, the client may manually finish and submit the transaction and results of the transaction may be automatically collected and presented both to the client and to the provider site for updating purposes. There are many possibilities.

In one embodiment, the plug-in downloaded may contain data and instruction for establishing more than one deep link per session wherein a client may elect to pay all existing and due bills in one transparent "session" wherein notification at completion of each transaction and the establishment and termination of each of possibly several deep link sessions may be made visible to the client in some notification fashion. In this case, the plug-in would cover all of the billing sites listed and selected for "pay all". In another embodiment, the client may elect to pay some but not all bills or pay bills according to a time-frame window which when reached while the user is connected to the network, will cause the plug-in to execute and establish the deep link to conduct the transaction.

One with skill in the art will recognize that there may be more or fewer steps in establishing and practicing a deep link session for conduction one or more transactions without departing from the spirit and scope of the present invention. In a simplest embodiment, a plug-in for establishing a deep link to a direct billing parties Web interface may be written for just the one service account and may cover just one transaction "Pay Bill". That is not to say that more complex navigation and task management functions cannot be provided in one plug-in for establishing a deep link session between the client and a service site.

Additional transactional-based options can be studied and enabled as transactions other than bill payment such as, communication requests, changing of passwords, usernames, or other credential-based data, new account registrations, purchases, and other types of transactions which may be performed in addition to payment of bills using the methods of the present invention and without departing from the spirit and scope thereof.

Figure 5:
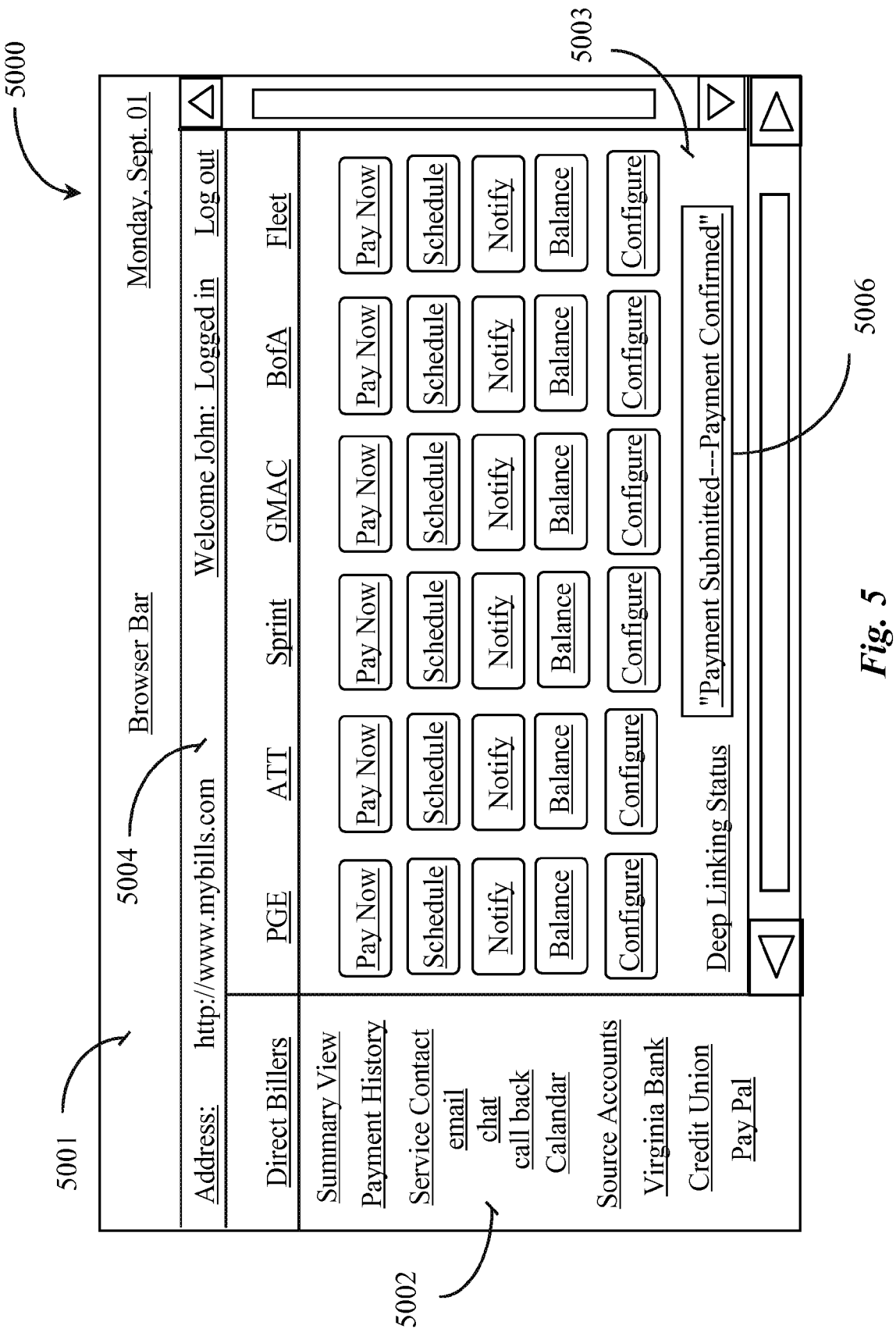
FIG. 5 is a block diagram illustrating a network interface page for listing a client's billing parties and options for interaction according to an embodiment of the present invention.

FIG. 5 is a block diagram 5000 illustrating a network interface page for listing a client's billing parties and options for interaction according to an embodiment of the present invention. Diagram 5000 represents a Web interface that may be provided to a client by a provider service analogous to service 1005 of FIG. 1. Interface 5000 may take the form of a browser window having a typical browser bar 5001, which would contain the typical browser icons adapted for normal Web browsing. An address bar, typical to Web browser applications is illustrated as part of interface 5000. The address shown, http://www.mybills.com is exemplary only and should not be construed as an actual address. A welcome note to a client, in this case, "John" is illustrated as "logged in". Login may be accomplished by populating a previous username/password login screen (not illustrated) or other secure login page. An option for logging out is also provided.

Interface 5000 has a screen area 5004 provided therein for listing direct billing parties a client has registered with the service of the invention. In this case exemplary parties are listed as PGE, ATT, Sprint, GMAC, BofA, and Fleet. The actual listed names may be provided in the form of hyperlinks, which may be highlighted before selecting another option such as pay, or may be activated to cause navigation directly to the service site if desired. It is noted herein that directly navigating to a service site is not associated with deep linking but may be provided as a convenience to clients.

Interface 5000 has an option window 5003 displayed therein and adapted for containing actionable option icons associated in this case, in columns, under each listed billing party. For example under the entry PGE, the options Pay Now, Schedule, Balance, and Configure. The same array of options is presented in columns under each listed billing party in this example. The Pay Now option when activated in association with a billing party may trigger an immediate download and installation of a deep link plug-in into the client's browser application. Once installed the plug-in may immediately initiate and establish a deep link to the billing parties Web interface and may perform login and transaction initiation and submission transparently to the client.

Immediately below the Pay Now option, the Schedule option may optionally be provided and adapted to enable a client to schedule a payment of a bill. By scheduling a bill payment associated with a billing party a client may be able to create a time window within which a downloaded and installed deep link plug-in may automatically execute and establish a deep link to the billing party at a first opportunity falling within the time frame established by the client.

Immediately below the Schedule option the Balance option may be adapted to produce a balance owed figure for a client such that when a bill becomes due the balance is accessible by activation of the balance icon. Optionally, the Configure option may be provided to enable a client to configure certain preferences like notification types and channels, or to enable a client to configure and change other account preferences, passwords, and so on.

A transaction status bar 5006 may optionally be provided and adapted to display the latest transaction status information and confirmation of a successful transaction for any listed billing entity. Transaction data may be viewed in one embodiment by highlighting one of the listed billing entities and then selecting "Latest Transaction". In this way the last confirmed transaction and transaction result along with the date and time the transaction occurred may be displayed. It is noted that real-time transaction status and confirmation may be accessible over a deep link between a client and a particular billing party during a deep link session wherein confirmation of a successful transaction appears in a pop-up window, information pane or some other mechanism of the client browser, perhaps provided with a deep-link plug-in.

In a case situation wherein payment confirmation status is not provided immediately during a deep link session, a client may access the provider site (interface 5000) and check for any information the site may have gathered for a client since a transaction by navigating and updating information on behalf of the client. In a case situation where bill payment confirmation is immediately available, or available during a same deep link session, and the particular session is running concurrently with a session between the client and the provider, then the provider may take advantage of the real-time information for updating account history and so on.

In one embodiment, a "Pay All" option may be provided within interface 5000 wherein activation thereof may trigger download of a deep link plug-in that will establish multiple serial deep-link sessions while the client remains connected to the provider. There are many possibilities.

In one embodiment, interface 5000 also contains a side bar pane 5002 wherein additional options may be provided, some of which may through activation thereof trigger download and initiation of a deep link. Reading from top to bottom in pane 5002, a first listed option, Summary View, may be provided and adapted to display a summary of all listed accounts registered for service at the provider site. A next option, payment history, may be adapted to display recent payment history for all or any of the registered accounts.

A next option Service Contact may be adapted to enable a client to establish a deep link to a service account for the purpose of initiating and submitting a contact request, which may be a chat request, an email request, or a request for a call back to a client telephone number. A deep link plug-in for a service request may prompt a client during or before download for contact information including channel preferences for correspondence. For example, if a deep-link plug-in is configured to initiate a chat request, first a deep link would be established and the chat request would be submitted. Notification could be provided when a contact agent has answered the request. At this time, the deep link session may revert to visual client control for the purpose of carrying out the chat correspondence. In this case, the login procedure and chat request submission is transparently performed and the client may engage in correspondence when the agent is present in the chat window.

In one embodiment, a Calendar option is provided in pane 5002 that may be adapted to enable a client to have a calendar view of bills due for any or all of a client's registered billing parties. In another embodiment, an option for viewing Source Accounts set up for bill payment may be provided that displays a client's listed accounts, in this case the exemplary accounts Virginia Bank, Credit Union, and Pay Pal account. In one embodiment, a user may add or delete source accounts or modify account information.

In a simplest embodiment only bill payment transactions are enabled through the provider interface and deep linking occurs when a client selects a payment action icon associated with one, some, or all billing parties registered. In this embodiment, one or subsequent deep link connections may be established by a downloaded plug-in that is already configured for navigation and payment instruction. In one embodiment, there may be an option for scheduling a deep link session, which may be established when a client is not specifically connected to the provider site, but still connected to the prevailing network.

In still another embodiment, navigation instructions are not necessarily downloaded to a client browser in order to establish a link between the client and a direct billing site. In this case, the deep link may be executed at the server side on behalf of the client instead of being physically provided as a plug-in to the client machine. In this embodiment, all of the Web navigation, login procedure, form population, payment submission, and confirmation receipt may be conducted during session between the service provider and the direct billing site. While, in this case an automated navigation instruction is not downloaded to a client, the navigation and task performance instructions are the same in both cases. In the latter embodiment, some information required to successfully complete a transaction may be dynamically provided, for example by scraping a bill payment amount from a Web interface and then immediately populating a bill payment form with the amount and submitting the payment.

One with skill in the art of bill consolidation and payment services will readily attest that the methods and apparatus of the present invention combine and provide benefits of bill consolidation services and direct billing service interaction in one interaction environment. In both cases of deep-linking (from client or from server), the bill consolidator, in a preferred embodiment, does not have to handle any funds or manage any payment accounts for the client.

The methods and apparatus of the present invention may be practiced over an Internet network or another WAN network enabled with network communication protocols used between network nodes. Likewise, the enabling apparatus of the invention may be provided as a series of machine-readable instructions downloaded as execution steps and interpreted by a resident client application capable of network navigation, or as a single packaged plug-in component that may automatically self-extract and install to an available client browser application without departing from the spirit and scope of the present invention. In view of the embodiments described herein and of those that are possible without departing from the spirit and scope of the present invention the present invention should be given the broadest interpretation. The spirit and scope of the present invention should be limited only by the appended claims.

What is claimed is:

1. A bill-paying system, comprising:
    an internet-connected server having a processor executing software from a non-transitory, machine-readable medium, the software providing:
    functionality accessing, on behalf of a user, a plurality of billing servers, logging in with credentials supplied by the user, and downloading information concerning one or more bills which the user is responsible to pay;
    functionality receiving a selection by the end user, indicating a bill the user wishes to pay; and
    functionality transmitting to the user a deep-link plug-in (DLP) for the billing server where the bill selected by the client is associated, the DLP redirecting the user to a page at the billing server where the user is enabled to pay the bill selected.

2. The bill-paying system of claim 1, wherein the client's connection to the internet connected server of the billing service remains intact when the user is redirected to a billing server, enabling the client to select and pay bills to individual ones of the billing servers in sequence.

3. The bill-paying system of claim 1, wherein the DLP provides confirmation and acceptance of new payment information.

4. A method for paying bills, comprising the steps of:
(a) accessing by a server having a processor executing software, on behalf of a user, a plurality of billing servers;
(b) logging in to the billing servers with credentials supplied by the user;
(c) downloading information concerning one or more bills which the user is responsible to pay;
(d) receiving a selection by the user, indicating a bill the user wishes to pay; and
(e) transmitting to the user a deep-link plug-in (DLP) for the billing server where the bill selected by the client is associated, the DLP redirecting the user to a page at the billing server where the user is enabled to pay the bill selected.

5. The method of claim 4, wherein the client's connection to the internet connected server of the billing service remains intact when the user is redirected to a billing server, enabling the client to select and pay bills to individual ones of the billing servers in sequence.

6. The method of claim 4, wherein the DLP provides confirmation and acceptance of new payment information.

* * * * *